(No Model.)

2 Sheets—Sheet 1.

H. A. BENEDICT.
PHOTOGRAPHIC CAMERA.

No. 478,837. Patented July 12, 1892.

WITNESSES:
Edward C. Rowland
J. E. Hoffman

INVENTOR
Hiram A. Benedict
BY Phillips Abbott
his ATTORNEY (No Model.) 2 Sheets—Sheet 2.
H. A. BENEDICT.
PHOTOGRAPHIC CAMERA.

No. 478,837. Patented July 12, 1892.

WITNESSES:
Edward C. Rowland.
J. E. Hoffman

INVENTOR
Hiram A. Benedict
BY Phillips Abbott
his ATTORNEY

UNITED STATES PATENT OFFICE.

HIRAM A. BENEDICT, OF NEW YORK, N. Y.

PHOTOGRAPHIC CAMERA.

SPECIFICATION forming part of Letters Patent No. 478,837, dated July 12, 1892.

Application filed December 1, 1891. Serial No. 413,656. (No model.)

*To all whom it may concern:*

Be it known that I, HIRAM A. BENEDICT, a citizen of the United States, and a resident of New York, in the county of New York and State of New York, have invented certain new and useful Improvements in Photographic Cameras, of which the following is a specification.

My invention relates to improvements in photographic cameras; and it consists in so constructing the apparatus that the camera may be folded or collapsed, thus materially reducing its size, and also devices are provided whereby the shutter is automatically set or put into condition for operation upon extending the camera preparatory to taking a picture, and also other devices whereby the shutter is reset for a second operation upon the closing together or collapsing of the camera; also, devices are provided whereby a film of sensitive material or "sensitive surface," as frequently called, may be placed in the apparatus wound upon a spool or its equivalent, so that an indefinite number of pictures may be taken, if desired, without opening the camera, and the parts are so arranged that this film is automatically operated upon extending and collapsing the camera, and means are also provided whereby the portions of the sensitive surface or film which have the separate pictures upon it may be indicated prior to development.

There are other features of my invention which will appear in the following specification, but need not here be particularized.

Figure 1:
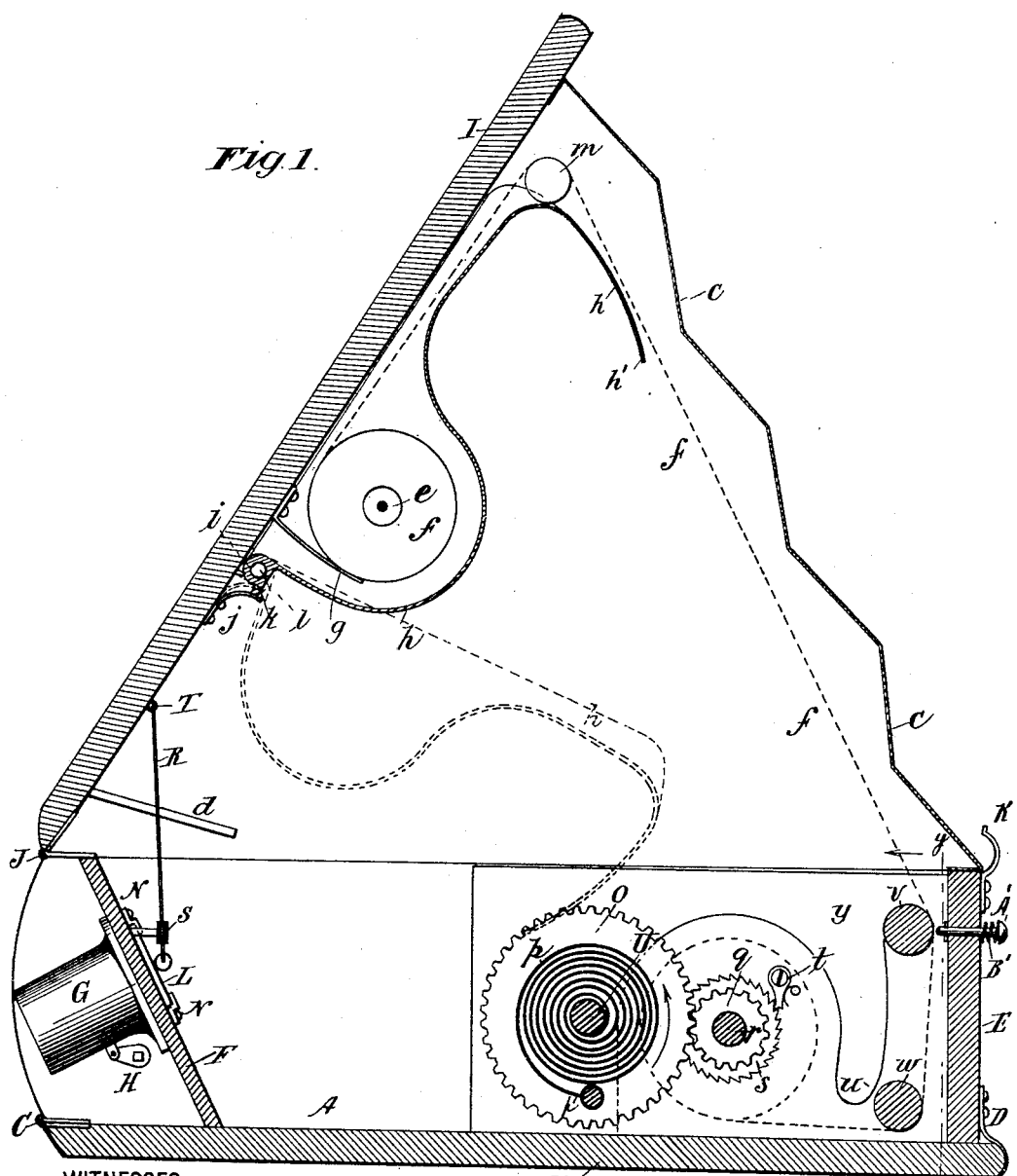
Figure 2:
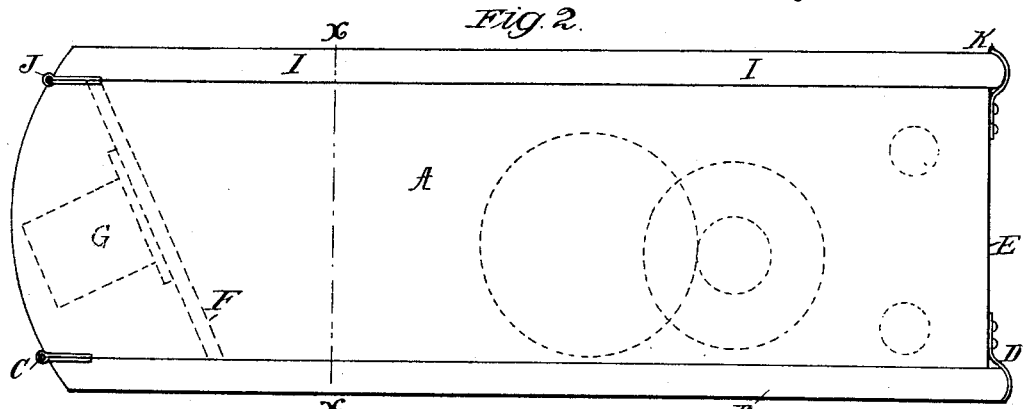
Figure 3:
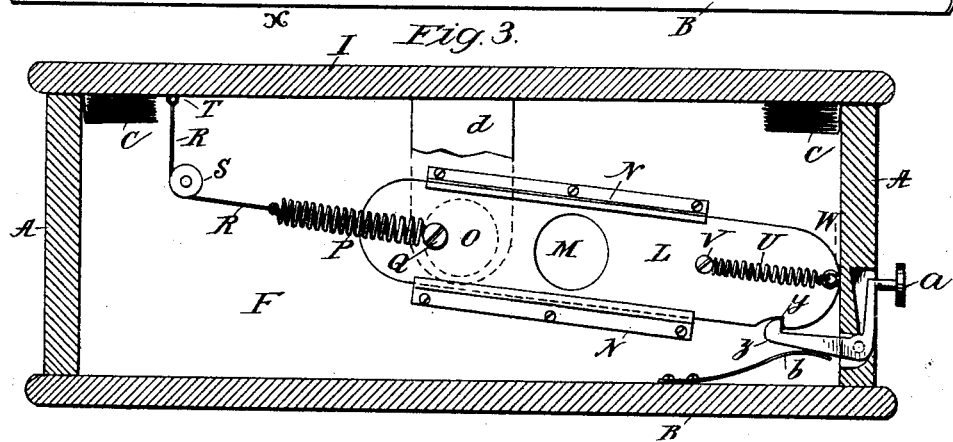
Figure 4:
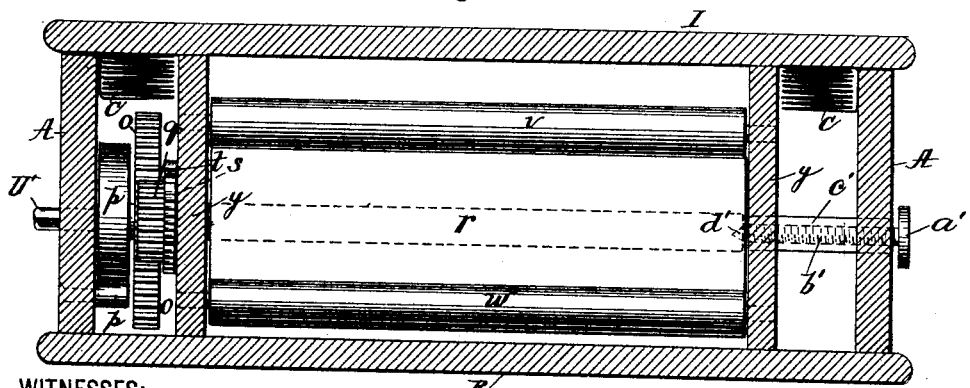

Figure 1 is a longitudinal vertical section, the side of the camera-box proper and of the bellows, which is next the observer, being removed. Fig. 2 is a side view of the device closed. Fig. 3 is an interior view of the front board of the camera as closed, showing the shutter and its coacting parts, taken on the line $x\ x$ of Fig. 2 and looking toward the left. Fig. 4 is end view taken on the line Y Y of Fig. 1 and looking toward the left, the camera, however, being closed.

A A are the sides of the camera-box.

B B is the bottom of the camera-box. It is hinged at C to the side pieces A, and is held in position when closed by a clip D.

E is the rear end piece of the camera-box, and F is the front end piece, to which a lens-tube G is attached in any preferred manner. This front piece F is set on an inclination, as shown in Figs. 1 and 2, the inclination being such as that the central light rays passing through the lens will be substantially, if not actually, at right angles to the plain of the film, as hereinafter explained.

H (see Fig. 1) is any suitable device for removing and focusing the lens or lenses, which are preferably fastened to a tube which moves within the outer tube G. The special form and arrangement of these parts constitute no part of my invention. They may be such as preferred.

I is the top board of the camera-box. It is hinged at J to the side pieces A, so that it may be swung upwardly, as shown in Fig. 1, and when closed it is held in place by a clip K, (see Fig. 2,) which is substantially the same as the clip D.

L (see Figs. 1 and 3) is a shutter provided with an aperture M, which slides longitudinally through ways N N, attached to the inside of the front piece F.

O is the exposure-aperture, through which light enters from the lens.

P is a relatively stiff spring attached at Q to the shutter L, and R is a cord which passes over a pulley S, fastened upon the front piece F, the other end of the cord being fastened to the hinged cover I at T.

U is another spring of considerably less strength than the spring P. It is fastened at V to the shutter and the other end at W to one side of the box.

Y is a detent made in the shutter L.

Z is a latch, which may be made in the form of a bell-crank, as shown, pivoted to the side of the camera-box and operated by a push-button $a$, a spring $b$ normally throwing the pawl of the bell-crank upwardly into engagement with the detent Y in the shutter.

$c\ c\ c$ are bellows, preferably gusseted, which surround the three sides of the camera-box which are exposed or opened when the top or cover I is elevated. The edges of the bellows are attached to the cover I on three sides and to the top edges of the sides A A and end board E of the camera-box, so that no light can enter, and when the top I is closed down the gussets in the bellows fold together upon one another, as shown in Figs. 3 and 4.

$d$ is the shield attached to the cover I, so arranged as to close down over the lens-opening O when the cover is closed.

$e$ is a spindle, upon which a roll or spool of film $f$ may be placed.

$g$ is a spring or equivalent friction device, which bears upon the surface of the roll of sensitive material $f$ or preferably upon some permanent surface attached to the spindle, so that the film, irrespective of the size of the roll, may be prevented from readily unwinding. There are various devices for accomplishing this purpose. Some of them are so arranged as to compensate or equalize the gradual reduction of the roll as it is unrolled during use. Any form of device which will prevent the too ready unrolling of the film will suffice.

$h$ is a shield hinged at $i$ to the top of the case, and $j$ is a spring which bears against a lug $k$ on the shield $h$, so that it is held either in its closed position, as shown in Fig. 1, in which it shields and protects the roll of film from contact with the light, or when folded down, as shown in dotted lines, Fig. 1, for the removal of the spool when empty. When the shield $h$ is in this last position, the spring rests against the flat face $l$ of the base of the lug $k$.

$m$ is a small roller or bar over which the film $f$ passes.

V is a shaft or arbor, the outer end V′ whereof projects beyond the side of the camera-box A and is squared so that it may be turned with a key. Upon this arbor a gear $o$ is keyed, and to the arbor a spring $p$ is attached, the other end of the spring being attached to any suitable part of the case or other support—as, for instance, a stud $p'$. The gear $o$ meshes into a pinion $q$, set upon a shaft $r$, to which a ratchet-wheel $s$ is also attached.

$t$ is a pawl, which controls the rotation of the ratchet-wheel $s$ in one direction.

$u$ is a shield similar to the shield $p$.

$v$ is a bar or small roller, and $w$ is another bar or small roller. These last-named parts—to wit, the rollers or bars $v$ and $w$ and shaft $r$—are supported in the side plates or bars $y\ y$, and the shaft $r$ is made removable by means of the thumb-screw $a'$ and threaded spindle $b'$, which are supported in a suitable threaded sleeve $c'$, fastened in the side of the camera-box A and in one of the plates $y$. The conical end of this threaded spindle $b'$ (seen at $d'$) enters a conical recess in the end of the shaft $r$, whereby it can be supported or released by running back the spindle $b'$ in a manner well understood.

The operation is as follows: The bottom board B is swung downwardly, so that the hand of the operator can be introduced into the interior of the camera-box. A roll or spool of the sensitive material (indicated at $f$) is then placed on the spindle $e$. There are various ways in which this can be done, and, as before stated, I do not limit myself to any special form. The end of the film is then drawn out over the roller $m$ behind the rollers $v$ and $w$ and is conducted to the spindle or shaft $r$ and is there attached. Then the shield $h$ is swung into its closed position. The foregoing operation had better be done in the dark-room. Then the spring $p$ is wound up by the use of a key. Then the bottom board B is closed again. The apparatus is now ready for use. It is taken in its collapsed condition and carried to the place where the picture is to be taken. When the subject is found and a proper position acquired by the operator, he extends the camera by unfastening the catch K and pulling upwardly the cover I. This act distends the bellows. It also tensely stretches the film, as indicated in dotted lines, Fig. 1, because the pawl $t$ prevents the spindle $r$, to which the free end of the film is attached, from unrolling. Consequently the film has to be drawn off from the roll which is upon the spindle $e$ or otherwise arranged at that point, and the film here is subjected to the pressure or retarding action of the friction device, so that it unrolls reluctantly, resulting in the tense stretching of the film, as before stated. The lifting of the cover I, also by pulling upon the cord R, puts the heavy spring P under tension, because the shutter is at this time held by the latch Z, engaging with the detent Y in the shutter. When the camera is properly adjusted relative to the object, so that it will properly appear upon the film, (and to aid in accomplishing this any desired form of finder may be used, which may be attached to or used in conjunction with the camera in any preferred manner,) then the operator pushes the push-button $a$, which, acting upon the bell-crank latch Z, releases the shutter L, and the spring P immediately shoots the shutter through its ways N N, overcoming the slight resistance of the spring U, and during this movement of the shutter L the aperture M in it comes coincident with the exposure-opening O and the picture is taken. The power of the spring P is such as to carry the shutter L so far to the left that the exposure-opening O is again covered by the solid part of the shutter at the right of the aperture M. The picture being now taken, the cover I is again closed or collapsed, during which the bellows fold upon themselves, and as the cover descends the spring $p$, acting upon the gear $o$ and pinion $q$, winds up the portion of the film upon which the picture has been taken, and also as the cover I descends a shield $d$ swings down in front of the shutter, so that light will be excluded from entering the camera, otherwise the picture might be injured by overexposure, because as the cover I descends the cord R is slackened and the tension is taken off from the spring P, which has already been somewhat relaxed by the movement of the shutter, and thereupon the spring U draws the shutter L, and by the time the cover I is entirely closed down it has pulled the shutter back, so that the detent Y again engages with the catch Z, and during this operation of course the aperture M in the shutter again passes across the exposure-aperture O, and if it were not for the shield $d$ the light would again be admitted and might, as stated, overexpose the picture. It will be noticed that the shield $d$ is so regulated as to length that it will not interfere with the light rays, and also that the shield $h$, which protects the roll of sensitive paper $f$, is extended, as at $h'$, so that the portion of the film near the roller or bar $m$, which is not used in taking the picture, is protected from the light. Thus there need be no waste or practically none of the film. After the cover I has been entirely closed down again a prick-point $A'$, which passes through the rear end of the camera-box and which is provided with a spring $B'$, which normally projects, is pressed inwardly, and it makes a prick-mark upon the film, thus indicating the dividing-line between succeeding pictures.

To take another picture, the operation just described is repeated. In this manner as many pictures as desired may be taken in succession, depending upon the size of the roll of film, and the portion of the film upon which pictures have been taken may be removed from the camera when in the darkroom by again opening the swinging bottom B and removing the spindle $r$ by the proper manipulation of the thumb-nut $a'$, as before indicated.

Any form of device for taking up the parts of the film upon which pictures have been taken may be employed. The spring and coacting parts illustrated by me are serviceable; but any other mechanism or device may be employed; also, any other form of shutter may be employed, and it may be set or put under tension in any preferred manner other than that shown by me, and it may be located on the end of the lens-tube on the exterior of the camera instead of on the inside, if desired. I prefer, however, the construction shown by me, because for various reasons it is convenient, and also because it is automatic. In fact, various alterations may be made in the construction of the device without departing from the essential features of my invention.

I claim—

1. In a photographic camera, the combination of a case, one side whereof is adapted to be opened, means for excluding the light attached to the movable side and also to the body of the case, a roll of sensitized material supported upon said movable side, and take-up mechanism for the slack of the film operated when the movable side is closed, substantially as set forth.

2. In a photographic camera, the combination of a case, one side whereof is adapted to be opened, means for excluding the light attached to the movable side and also to the body of the case, a roll of sensitized material supported upon said movable side, and take-up mechanism for the slack of the film, operated when the movable side is closed, and shutter mechanism operated by the opening of the said movable side, substantially as set forth.

3. In a photographic camera, the combination of a case, one side whereof is adapted to be opened, means for excluding the light attached to the movable side and also to the body of the case, a roll of sensitized material supported upon said movable side, take-up mechanism for the slack of the film, operated when the movable side is closed, and shutter mechanism operated by the opening of the said movable side, and a shield to protect the roll of sensitized material fastened upon the movable side, substantially as set forth.

4. In a photographic camera, the combination of a case, one side whereof is adapted to be opened, means for excluding the light attached to the movable side and also to the body of the case, a roll of sensitized material supported upon said movable side, take-up mechanism for the slack of the film, operated when the movable side is closed, shutter mechanism operated by the opening of the said movable side, and a shield attached to the movable side, arranged to close down over the lens-opening when the said side is closed, substantially as set forth.

5. A camera comprising the combination of a case, one side whereof is hinged, means for excluding the light attached to the movable side and also to the body of the case, means attached to the hinged side and to the case for the support of a film across the larger end when the device is opened, a lens arranged focally at right angles to the film, and a shutter for the lens, substantially as set forth.

6. A camera comprising the combination of a case, one side whereof is hinged, means for excluding the light attached to the movable side and also to the body of the case, means attached to the hinged side and to the case for the support of a film across the larger end when the device is opened, a lens arranged focally at right angles to the film, a shutter for the lens, and means to take up the slack of the film upon the closing of the said hinged side, substantially as set forth.

7. The combination, in a camera, of a case, a hinged part, means for excluding the light, attached to the hinged part and also to the body of the case, a roll of sensitized material supported upon the hinged part, means to take up the slack of the sensitive material supported upon the case, a lens arranged at right angles to the film when distended, and a shutter connected with and operated by the hinged part, and means to reset the shutter upon closing the same, substantially as set forth.

Signed at New York, in the county of New York and State of New York, this 16th day of November, A. D. 1891.

HIRAM A. BENEDICT.

Witnesses:
 PHILLIPS ABBOTT,
 THOS. A. NOLAN.